US008719437B1

(12) United States Patent
Bazzarella, Jr. et al.

(10) Patent No.: US 8,719,437 B1
(45) Date of Patent: May 6, 2014

(54) ENABLING STREAMING TO A MEDIA PLAYER WITHOUT NATIVE STREAMING SUPPORT

(75) Inventors: Jose C. Bazzarella, Jr., Kitchener (CA); Anthony P. Joch, Waterloo (CA); Roman C. Kordasiewicz, Elmira (CA); Alexander I. Leyn, Kitchener (CA)

(73) Assignee: Avvasi Inc., Kitchener, Ontario (CA)

( * ) Notice: Subject to any disclaimer, the term of this patent is extended or adjusted under 35 U.S.C. 154(b) by 762 days.

(21) Appl. No.: 12/540,773

(22) Filed: Aug. 13, 2009

(51) Int. Cl.
*G06F 15/16* (2006.01)
*H04N 21/44* (2011.01)
*H04N 21/4402* (2011.01)

(52) U.S. Cl.
CPC ....... *H04N 21/44* (2013.01); *H04N 21/440218* (2013.01)
USPC ............................ 709/231; 370/465; 709/219

(58) Field of Classification Search
CPC ..... G06F 13/44; H04N 21/44; H04N 21/6125
USPC ......... 709/231, 217, 208, 204, 202, 240, 234, 709/224, 219, 999.107; 375/219, 211; 370/468, 435, 356, 338, 329, 310, 235, 370/216; 379/93.15, 93.01; 710/261, 267
See application file for complete search history.

(56) References Cited

U.S. PATENT DOCUMENTS

| | | | | |
|---|---|---|---|---|
| 2001/0009548 | A1* | 7/2001 | Morris | 370/392 |
| 2008/0195761 | A1* | 8/2008 | Jabri et al. | 709/250 |
| 2009/0063693 | A1* | 3/2009 | Bond et al. | 709/231 |
| 2011/0228859 | A1 | 9/2011 | Sugimoto et al. | |
| 2012/0117225 | A1 | 5/2012 | Kordasiewicz et al. | |

* cited by examiner

*Primary Examiner* — Emmanuel L Moise
*Assistant Examiner* — Charles Murphy
(74) *Attorney, Agent, or Firm* — Bereskin & Parr LLP/S.E.N.C.R.L., s.r.l.

(57) ABSTRACT

A method for enabling streaming to a media player without native streaming support is disclosed. Step (A) of the method may author a media file based on a content signal. The media file may have an indexed format compatible with the media player. The content signal may (i) be received from a remote server through a network, (ii) use a transfer protocol and format at least one of which is incompatible with the media player and (iii) convey both video data and audio data representative of a scene. Step (B) may generate a local signal carrying the media file. The local signal generally has a transfer protocol compatible with the media player. Step (C) may transfer the local signal to the media player while the content signal is being received. The media player generally recreates the video data as a visual depiction on a display based on the local signal.

20 Claims, 6 Drawing Sheets

ENABLING STREAMING TO A MEDIA PLAYER WITHOUT NATIVE STREAMING SUPPORT

FIELD OF THE INVENTION

The present invention relates to streaming video generally and, more particularly, to a method and/or architecture for enabling streaming to a media player without native streaming support.

BACKGROUND OF THE INVENTION

Many conventional media-capable platforms and media players support only a subclass of available content delivery protocols. The delivery subclass is usually limited to the Hypertext Transport Protocol (HTTP), commonly referred to as a progressive download (PD) protocol. In such environments, a client media player requests a file from a web server. The web server responds to the request by delivering the file via HTTP/TCP (Transmission Control Protocol).

The file is typically organized in an indexed format that is similar or related to the International Organization for Standardization (ISO) base media file format. In the ISO base media file format, an index or metadata is used to seek and decode the content samples of the file. The index is usually found in a single section of the file. The index is typically stored at the start or at the end of the file. Such file formats infer an MPEG-4 systems-like environment.

Encoding/authoring of content in an indexed format relies on the knowledge of the size of the media samples because the metadata contains a complete table of contents with size/position information for all samples in all tracks for the entire clip. Therefore, a size of all compressed audio and video frames must be set before the authoring is finalized, and cannot be changed afterwards.

Streaming formats, such as Real-time Transport Protocol (RTP), Flash Video (FLV) format and MPEG-2 Transport Stream (TS) format, do not have an index and are not interoperable with the MPEG-4 systems-like environments. Many platform/media players either have no support or very poor (i.e., unstable) support for such formats. Other conventional platforms/players are limited in terms of the mix of formats and transport protocols supported. For example, some platforms/players lack RTP/TCP support and only provide unreliable RTP/UDP (User Datagram Protocol). Other conventional platforms/players have a limited ability to buffer data received at an input.

The limitations cause several disadvantages, such as unbounded content, unknown size content, incompatible content and unreliable networks. For example, live content or content in the process of being encoded is unbounded. However, authoring of unbounded content cannot be finished and therefore cannot be accessed until after the encoding has completed. As such, any stored content having a size that changes dynamically during the act of delivery is difficult to process. For example, transcoding of content during delivery to compensate for varying network conditions can alter the size of the content. Availability of the content on a platform/device can be hindered by format incompatibilities or complicated by managing multiple formats. Content providers are either locked out of certain platforms/media players or forced to make content available in many formats. Limiting delivery of the content to a few supported formats can be less reliable and/or efficient than non-supported formats for a given application or service. For example, using TCP can provide more robust transmission and playback during lossy network conditions than UDP. Furthermore, some supported formats are unable to monitor or control the amount of data in the client buffer resulting in transmission problems during dynamic network conditions.

SUMMARY OF THE INVENTION

The present invention concerns a method for enabling streaming to a media player without native streaming support. Step (A) of the method may author a media file based on a content signal. The media file may have an indexed format compatible with the media player. The content signal may (i) be received from a remote server through a network, (ii) use a transfer protocol and format at least one of which is incompatible with the media player and (iii) convey both video data and audio data representative of a scene. Step (B) may generate a local signal carrying the media file. The local signal generally has a transfer protocol compatible with the media player. Step (C) may transfer the local signal to the media player while the content signal is being received. The media player generally recreates the video data as a visual depiction on a display based on the local signal.

The objects, features and advantages of the present invention include providing a method and/or architecture for enabling streaming to a media player without native streaming support that may (i) leverage native player efficiencies, (ii) optimize battery life, (iii) optimize user experience, (iv) optimize playback quality, (v) remove non-causality of indexed file formats for transmission, (vi) enable unbounded content with minimal to no latency, (vii) permit dynamic and continuous adaptation to unbounded size content, (viii) leverage formats not normally supported by the native players, (ix) increase content ubiquity/accessibility by bringing previously unsupported formats to a platform and/or (x) increase flexibility of protocol mix for applications/services to optimize resources.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention may enable interoperability between non-native media player compliant formats available from a variety of remote streaming servers and MPEG-4 systems-like environments of media players that are native to media-capable platforms and/or devices. The platforms/devices may include, but are not limited to cellular telephones, personal digital assistants, portable video players, personal computers and the like. Hereafter, the media-capable platforms and devices may be generically referred to as apparatuses or devices. The term "format" generally refers to how data is arranged. The term "protocol" generally refers to how data is transferred. The term "media" may refer to video, audio, images or a combination of some or all (e.g., movies).

Figure 1:
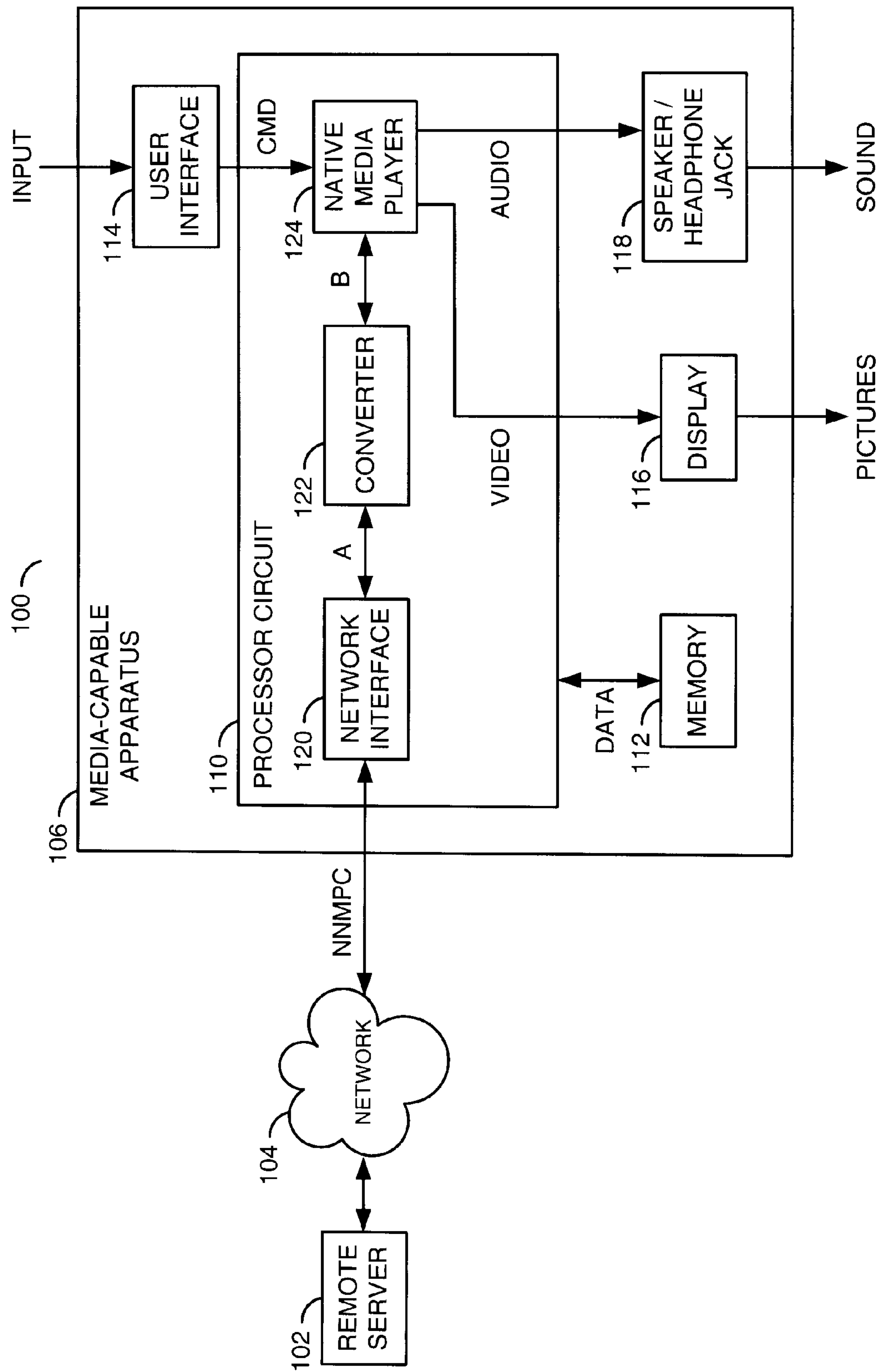
FIG. 1 is a block diagram of a system in accordance with a preferred embodiment of the present invention.

Referring to FIG. 1, a block diagram of a system 100 is shown in accordance with a preferred embodiment of the present invention. The system generally comprises a server (or computer) 102, a network 104 and an apparatus (or device) 106. The server 102 and the apparatus 106 may represent modules and/or blocks that may be implemented as hardware, software, a combination of hardware and software, or other implementations.

The apparatus 106 generally comprises a media-capable device. In some embodiments, the apparatus 106 may be implemented as a computer, an entertainment system, video-game console and the like. User interaction with the apparatus 106 may be through dedicates controls, a keyboard, a mouse, a touchscreen, a hand-held remote control device and the like. In other embodiments, the apparatus 106 may have a sufficiently compact size and light weight to be easily carried by a user with a single hand. A layout of the apparatus 106 may allow the user to operate the apparatus 106 with a single hand while holding the apparatus 106 in the same hand.

The network 104 may be implemented as a wired network and/or a wireless network. The server 102 and the apparatus 106 are generally physically remote and separate from each other. As such, the server 102 may be referred to as a remote server.

A bi-directional signal (e.g., NNMPC) may be exchanged between the server 102 and the apparatus 106 through the network 104. The apparatus 106 may receive a signal (e.g., INPUT) from a user. An optical signal (e.g., PICTURES) may be generated by the apparatus 106 and presented to the user. The apparatus 106 may also generate an audio signal (e.g., SOUND) that is presented to the user. In some embodiments, the signal SOUND may comprise an electrical signal.

The apparatus 106 generally comprises a circuit (or module) 110, a circuit (or module) 112, a circuit (or module) 114, a circuit (or module) 116 and a circuit (or module) 118. The circuits 110 to 118 may represent modules and/or blocks that may be implemented as hardware, software, a combination of hardware and software, or other implementations. In some embodiments, the apparatus 106 may be powered through a cord plugged into a wall socket. In other embodiments, the apparatus 106 may be battery powered to allow for ease of mobility.

The signal NNMPC may be both received into and presented from the circuit 110. As received into the circuit 110, a format of the signal NNMPC may be Non-Native Media Player Compliant. A signal (e.g., DATA) may be exchanged between the circuit 110 and the circuit 112. The signal INPUT may be received by the circuit 114. A signal (e.g., CMD) may be generated by the circuit 114 and presented to the circuit 110. A signal (e.g., VIDEO) may be generated by the circuit 110 and transferred to the circuit 116. The circuit 110 may generate a signal (e.g., AUDIO) that is presented to the circuit 118. The circuit 116 may generate and present the signal PICTURES. The signal SOUND may be generated and presented by the circuit 118.

The circuit 110 may be implemented as a processor circuit. The circuit 110 is generally operational to execute software programs to change the content received in the signal NNMPC into the signal VIDEO and the signal AUDIO. Selection of the content and control of the playback may be governed by the signal CMD.

The circuit 112 generally implements a memory circuit. The circuit 112 may be operational to store the software programs executed by the circuit 110. The circuit 112 may also act as temporary storage for information generated and consumed during the requesting and playback of the content received from the server 102.

The circuit 114 may implement a user interface circuit. The circuit 114 is generally operational to generate the signal CMD based on instructions received from the user via the signal INPUT. The circuit 114 may be implemented as switches, buttons, touch sensitive screens, keyboards, computer mice and the like.

The circuit 116 generally implements a video display screen. The circuit 116 may be operational to convert the video content received in the signal VIDEO into a sequence of visible pictures represented by the signal PICTURE. The visible pictures may be viewable by the user.

The circuit 118 may implement one or more speakers and/or a headphone jack. The circuit 118 is generally operational to convert the audio data received in the signal AUDIO into the signal SOUND. In some embodiments where the circuit 118 comprises one or more speakers, the signal SOUND may be an audible sound that the user hears. In other embodiments where the circuit 118 comprises an audio jack, the signal SOUND may be an electronic signal suitable for driving a set of headphones.

The circuit 110 generally comprises a module (or block) 120, a module (or block) 122 and a module (or block) 124. The modules 120 to 124 may represent circuits and/or blocks that may be implemented as hardware, software, a combination of hardware and software, or other implementations. In some embodiments, the modules 120 to 124 may be implemented as software modules (or code) stored in the circuit 112 and executed by the circuit 110.

The module 120 may send to and receive signal communications from the server 102 via the signal NNMPC. The module 120 and the module 122 may communicate with each other via a signal (e.g., A). The module 122 and the module 124 may communicate with each other through a signal (e.g., B). The module 124 may communicate with the circuit 114 through the signal CMD. The module 124 may generate the signals VIDEO and AUDIO.

The module 120 may implement a network interface module. The module 120 is generally operational to communicate with the server 102 through the network 104 to request and receive media content. A particular content being requested may be identified by the module 122 to the module 120 using data in the signal A. The content received from the server 102 may be parsed into video data and audio data and presented back to the module 122 in the signal A.

In an example case, a Real Time Streaming Protocol (RTSP) conversation may be initiated between the module 120 and the server 102. The server 102 may deliver the individual media tracks from a source audio/video clip in related RTP streams. Where converting from RTP to an MPEG-4 Part 14 (MP4) container format, non-causal header data may be generated for the MP4 container. The data generally includes sequence level information such as audio sampling rate and video frame size and video frame rate. The information may be readily derived from the various content access or transport protocols discussed above, for example from a Session Description Protocol (SDP) in a prior RTSP conversation. The data may also include complete sample size and position information. If the data is local to a client and not being transmitted over the network 104, the sample sizes may be defined as maximum in a worst-case sense for the given stream.

The module 122 generally implements a converter module. The module 122 may be operational to convert the video data and the audio data received from the module 120 to a native media player compliant format intended for the module 124. The module 122 may subsequently arrange the non-compliant format received data into one or more final formats that are compatible with the module 124.

The module 124 may implement a media player. The module 124 is generally operational to convert the content received in the signal B into the signal VIDEO and the signal AUDIO. In some embodiments, the module 124 may be native (e.g., built-in) to the apparatus 106. In other embodiments, the module 124 may be added (e.g., downloaded) into the apparatus 106. The module 124 may be configured to minimize resource use, such as battery consumption, processor use and/or memory use.

Most implementations of the module 124 may support indexed formats. However, some implementations may have minimal support for streaming (or non-indexed) formats. Some of the modules 124 may be invoked sequentially and served blocks of memory containing non-overlapping clips while maintaining a smooth playback. Some modules 124 may be invoked via a Uniform Resource Identifier (URI), in which case a single instance is executed by the circuit 110. Therefore, the entire media clip may be provided to the module 124 to allow a smooth playback.

The module 122 generally commands the module 120 to obtain particular content from the server 102. The content may be received by the module 120 via an interconnect through the network 104. The content may be parsed into queues conveyed to the module 122 via the signal A. The module 122 may generate appropriately formatted data in the signal B from the queued data. The data, or consumable portions of the data, may be transferred to the module 124 for normal processing. The data is generally sent to the module 124 with a protocol supported by the module 124.

Content may be accessed from the server 102 using one or more protocols. For example, the module 120 may use RTSP or HTTP to request transmission of a particular content from the server 102. The content may be delivered by the server 102 to the apparatus 106 using one or more formats and/or protocols. In some situations, the format may be a streamable or a streaming format, such as the Real-time Transport Protocol (RTP) format, Flash Video (FLV) format, MPEG-2 Transport Stream (TS) format, fragmented MP4 format and the like. The streaming formats generally allow representations of streams of unknown/unbounded length as well as known/finite length streams. For example, a live broadcast may be represented by an unbounded length stream. An example of a known or finite length stream may be a broadcast of a pre-recorded program.

The server 102 may also generate the signal NNMPC carrying indexed formats. The indexed formats may include, but are not limited to the MP4 format, QuickTime MOV format (QuickTime® is a trademark of Apple Inc., Cupertino, Calif.), and Third Generation Partnership (3GP) format for non-native media player compliant applications. Proprietary indexed formats may be used in non-native media player compliant applications. Other indexed formats may be implemented to meet the criteria of a particular application.

The formats may also be categorized as streaming or streamable formats that may include, but are not limited to, the RTP format, FLV format, fragmented MP4 format and MPEG-2 transport stream format. The above formats may be used in non-native media player compliant applications. Other proprietary formats may also be used in non-native media player compliant applications to meet the criteria of a particular application.

In an example case of a fragmented MP4 format, subsections of clips may be authored incrementally. Each subsection may have a corresponding duration ranging from several milliseconds to several seconds. Metadata may be created only for the particular subsection being authored. In an example case of a proprietary MP4-like format, the metadata, sample data or some combination of the two, may not comply with a known standard. An example of non-compliant sample data may have each sample include a non-compliant field expressing a number of real sample bytes/words (or conversely the number of padding bytes/words) within a padded sample.

Delivery of the content streams to the apparatus 106 may be achieved, at least in part, through a wireless channel in the network 104. Example wireless networks may include, but are not limited to, a wireless Ethernet network, a WiFi network, a 2G network, a 3G network and the like. The network 104 may include, at least in part, a wired channel. Transport through the network may be controlled by the Transmission Control Protocol (TCP), User Datagram protocol (UDP) and the like.

One or more methods may be used to move the content through the network 104. For example, servers may send the content using the RTP format interleaved with an RTSP/TCP flow. The interleaving technique may be referred to as RTP/RTSP over TCP and/or interleaved RTP. Furthermore, an RTP/RTSP over UDP approach may comprise RTSP in a TCP flow and/or RTP in UDP flows.

Servers may provide the content through either a progressive download or a stream. For example, web servers may deliver the content as a linked object (e.g., a file) over HTTP (e.g., a progressive download case). The term "web server" generally refers to servers that support progressive downloads. In another example, a streaming server may deliver content through a streaming protocol. An example of a streaming server is a server that delivers the content via RTP. Other types of servers may be implemented to meet the criteria of a particular application.

The server 102 may receive the content from one or more local and/or remote sources. In some embodiments, the content may be stored local to the server 102 in the media (e.g., file descriptors). In other embodiments, the content source may be accessed by the server 102 over Serial Advanced Technology Attachment (SATA) interface, an Integrated Device Electronics (IDE) interface, a Peripheral Component Interconnect (PCI) interface, a Universal Serial Bus (USB) interface, an IEEE 1394 bus interface and the like. The content may also be available via network stored media (e.g., sockets). Furthermore, the content may be provided live to the server 102 through audio/video interfaces in real-time. The live content may be raw data of scenes as captured by cameras and microphones. The live content may be encoded prior to or after reaching the server 102.

Figure 2:
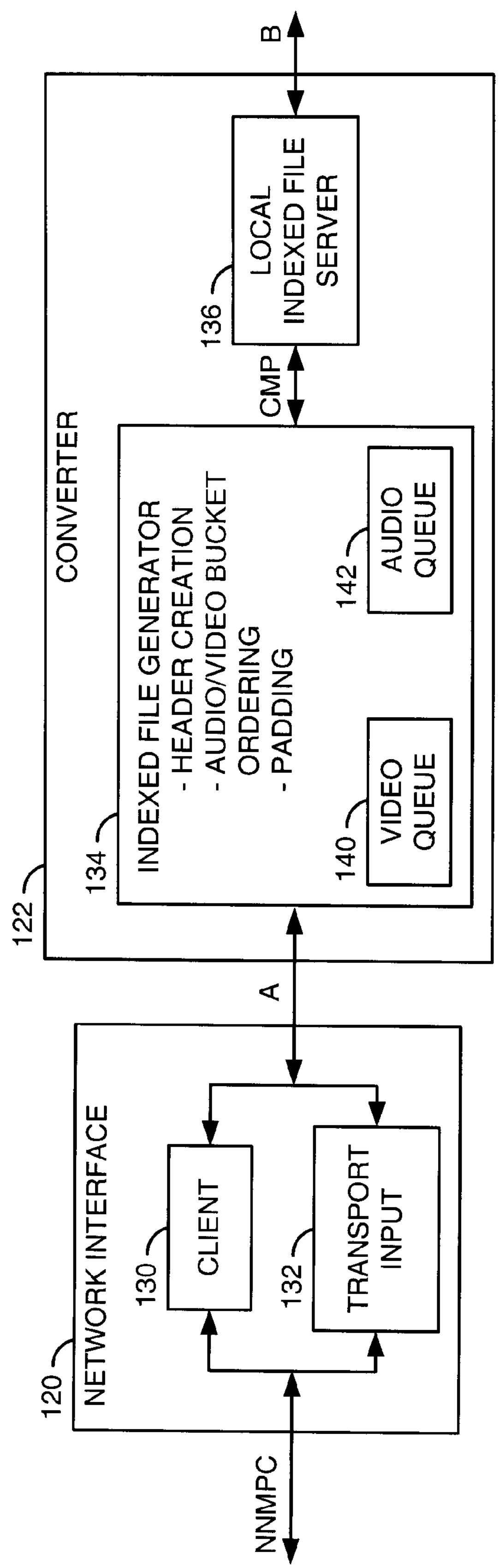
FIG. 2 is a detailed block diagram of a network interface module and a converter module.

Referring to FIG. 2, a detailed block diagram of the module 120 and the module 122 is shown. The module 120 generally comprises a module (or block) 130 and a module (or block) 132. The module 122 generally comprises a module (or block) 134 and a module (or block) 136. The module 134 generally comprises a module (or block) 140 and a module (or block) 142. The modules 130 to 142 may represent circuits and/or blocks that may be implemented as hardware, software, a combination of hardware and software, or other implementations.

The signal NNMPC may be exchanged between (i) the server 102 and the module 130 and (ii) the server 102 and the module 132. The signal A may be exchanged between (i) the module 134 and the module 130 and (ii) the module 134 and the module 132. A signal (e.g., CMP) may be exchanged between the module 134 and the module 136. The module 136 may exchange the signal B with the module 124.

The module 130 may be implemented as a client circuit or client software. In some embodiments, the module 130 may implement an RTSP/RTP client. The module 130 is generally operational to communicate with the server 102 to request the intended content as selected by the user and to manage the full session life cycle.

Requests for the content may include, but are not limited to, file access requests, HTTP requests, RTSP requests and the like. Network requests typically involve a streaming format-specific conversation (e.g., an AppleTalk Transaction Protocol conversation or an RTSP conversation. AppleTalk® is a trademark of Apple Inc., Cupertino, Calif.). Communication of the requests may be via an interconnect, examples of which are generally provided below.

Typical commands that the module 130 sends to the server 102 during an RTSP conversation generally include a DESCRIBE command, a SETUP command, a PLAY command, a PAUSE command and a TEARDOWN command. Other commands may be implemented to meet the criteria of a particular application.

The module 132 may implement a transport input circuit. The module 132 is generally operational to receive the content in the signal NNMPC via the interconnect. For example, incoming RTP packets received after the PLAY command is executed may be processed by the module 132.

The server 102 may reply to a DESCRIBE command with a response that contains SDP data. The following pieces of information may be extracted from the SDP by the module 132 that may be useful to create an indexed format file: (i) audio clocks per second, (ii) video clocks per second, (iii) frame rate, (iv) number of audio channels and (v) codec specific information.

The module 132 may also stitch received packets into complete units (e.g., audio and video frames). For audio packets, some initial bytes may be stripped from the payload to form an audio unit. Such bytes generally provide a variable length encode of a number of audio bytes and may be part of standard Advanced Audio Coding (AAC) over RTP. In addition, video packets may be stitched together, as appropriate, to form complete video units. The video (e.g., Network Abstraction Layer (NAL)) units may be processed and extra information such as H.264 Supplemental Enhancement Information (SEI), Sequence Parameter Set (SPS) and Picture Parameter Set (PPS) NALs may be removed. The audio units and the video units parsed from the signal NNMPC by the module 132 may be placed into queues upon arrival. Two queues may be created, the audio queue 142 for storing the audio data and the video queue 140 for storing the video data.

The module 134 generally implements an indexed format file generator circuit. The module 134 may be operational to convert the video data and audio data from the signal A into an indexed format. The data may be presented from the module 134 to the module 136 in the signal CMP. Many possible indexed formats may be available (e.g., MP4, MOV, 3GP and the like). Classification and further examples of several indexed formats are enumerated below. Additional processing of the data may be applied by the module 134 to generate information suitable for consumption by the module 124.

The worst-case audio and video sample sizes may be strictly enforced by the server 102 (for example, by dropping, transcoding or recoding the violating samples) and may be statically configured or negotiated per session between the module 130 and the server 102. Furthermore, the media tracks may be interleaved in the signal CMP, in which case patterns of alternating audio/video frames are generally deduced from the source audio/video frame rates. External events, such as packet drops and frame rate changes may be supported.

The MPEG-4 specification, ISO/IEC 14496-14:2003, generally defines the MP4 format. The MP4 format may comprise discrete units of data called "boxes" or "atoms". A box and/or atom may be defined as a simple building block. For example, a "moov" box may be a parent box with no content except other boxes. A "trak" box may contain other boxes that describe track information. A "mdia" box may contain other boxes that describe the media. A "minf" box generally contains media information, such as codec type. A "stbl" box may define a sample table that may contain stco and stsz boxes. A "stco" box of a media track generally lists offsets for various chunks of information that comprise the media track. A "stsz" box may contain sample size information.

In order for an RTSP/RTP streaming format to be converted into a progressive MP4 (e.g., indexed format) that may start playing immediately, video and audio samples (e.g., frames) of fixed size may be used. The fixed size of samples may be referred to as buckets. Each bucket generally contains the original video or the original audio received in the signal NNMPC, along with player compliant padding. With fixed bucket sizes and a fixed number of buckets, a table of contents (e.g., moov box) may be generated without having to know the sizes of samples a priori. As samples arrive, the samples may be placed in an appropriate bucket and padded accordingly.

The module 134 may generate a complete table of contents (e.g., a moov box) from the parameters extracted from the SDP by the module 132. The audio/video sampling frequencies in combination with the video frame rate may be used to generate the appropriate number of audio/video samples per second in an MP4 file.

By way of example, the following SDP attribute (e.g., "a") lines may have been parsed from the content:

*a*=rtpmap:96 MP4A-LATM/32000/2

*a*=rtpmap:97 H264/90000

*a*=framerate:24

The audio/video clocks per second and video frames per second may be extracted as follows:

audioClocksPerSec=32000 videoClocksPerSec=90000 framerate=24.0

Header variables may be calculated using the following formulas:

audio_samples_per_sec=audio_clocks_per_sec/audio_samples_per_clock video_samples_per_sec=framerate ratio=audio_samples_per_sec/video_samples_per_sec video_buckets=server determined value audio buckets=video_buckets×ratio Application of the example parameters produces:

audio_samples_per_sec=31.25 video_samples_per_sec=24.0 audio buckets=13020 video buckets=10000

As illustrated in the above example, thousands (e.g., 23020) of buckets (e.g., 13020 buckets for audio and 10000 buckets for video) may be allocated for an MP4 file. Each of the buckets is generally indexed from 0 to N (e.g., 0 to 23019). The buckets may be dispersed evenly throughout the MP4 file. The module 134 may keep track of whether each given bucket should be filled with audio data or video data.

Since the buckets may be of fixed size, only the bucket offsets in the MP4 file are generally specified in a stco atom (e.g., moov->trak->mdia->minf->stbl->stco) of each respective track (e.g., audio track and video track) in the table of contents (e.g., moov atom). Sample size data (e.g., stsz atom) may be fixed per track for all samples available.

The module 134 may also provide a padding function so that the audio units and the video units extracted from the RTP stream may be expanded to fill respective padded MP4 buckets of fixed size. Different padding techniques may be used, depending on the hardware capabilities of the apparatus 106. For powerful apparatuses 106, the padding may be fully compliant with the module 124. For slower apparatuses 106, a lower complexity padding that may be decoded by the module 124 is generally employed.

The module 136 may implement a local server. In some embodiments, the module 136 may implement an indexed file server. The module 136 is generally operational to serve the incrementally generated format file created by the module 134 to the module 124 using a protocol accepted by the module 124. The formatted data may be received from the module 134 through the signal CMP. Subsequently, the data may be presented from the module 136 to the module 124 in the signal B. As such, the signal B may be referred to as a local signal. Depending on the platform Software Development Kit (SDK) and the Application Programming Interface (API) of the module 124, one or more of the following server types may be employed: (i) a web server, (ii) a read server and/or (iii) a short duration server.

Figure 3:
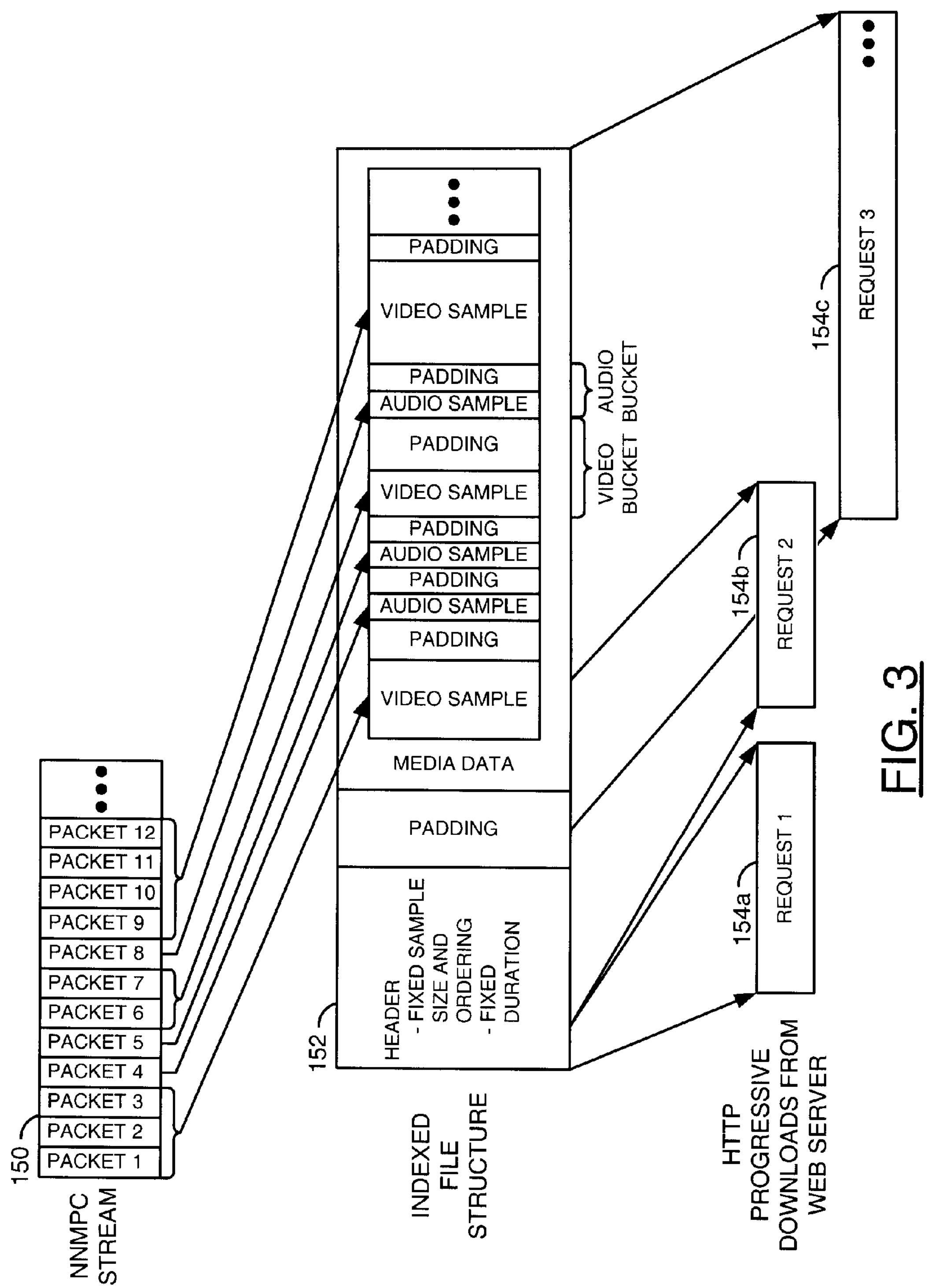
FIG. 3 is a block diagram of an example data organization involved in a web server implementation.

Referring to FIG. 3, a block diagram of an example data organization involved in a web server implementation is shown. In the web server implementation, packets 150 received in the signal NNMPC may be converted into an indexed format file 152. The indexed format file 152 may be delivered to the module 124 via responses to standard HTTP GET requests. The module 124 may submit multiple requests in parallel for data within the signal B for different parts of the indexed format file. The requests may be made with the Byte Range functionality of HTTP. The requested portions 154*a*-154*c* of the indexed format file may be delivered from the module 136 via the signal B to the module 124. A caching functionality of the module 124 should be disabled while receiving the file from the module 136.

Figure 4:
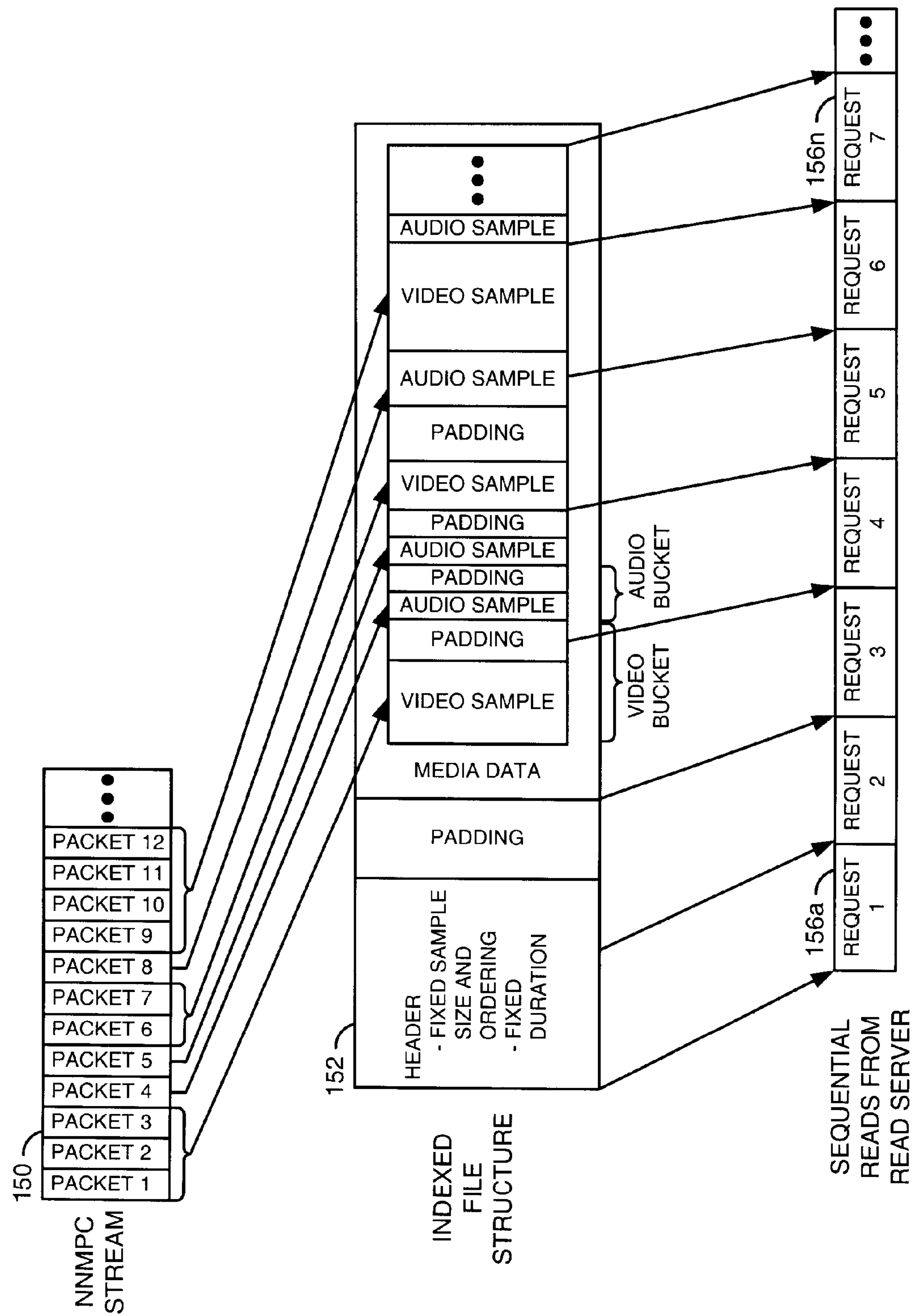
FIG. 4 is a block diagram of an example data organization involved in a read server implementation.

Referring to FIG. 4, a block diagram of an example data organization involved in a read server implementation is shown. In a read server implementation, the module 124 may request the indexed format file a single block at a time. The block requests may be incremental and continuous. Each of the requested blocks 156*a*-156*n* may be delivered sequentially in the signal B (e.g., not pipelined) and may not overlap. The read server implementation is generally possible where the API of the module 124 may be provided a read( ) call back method to get portions of the source file.

Figure 5:
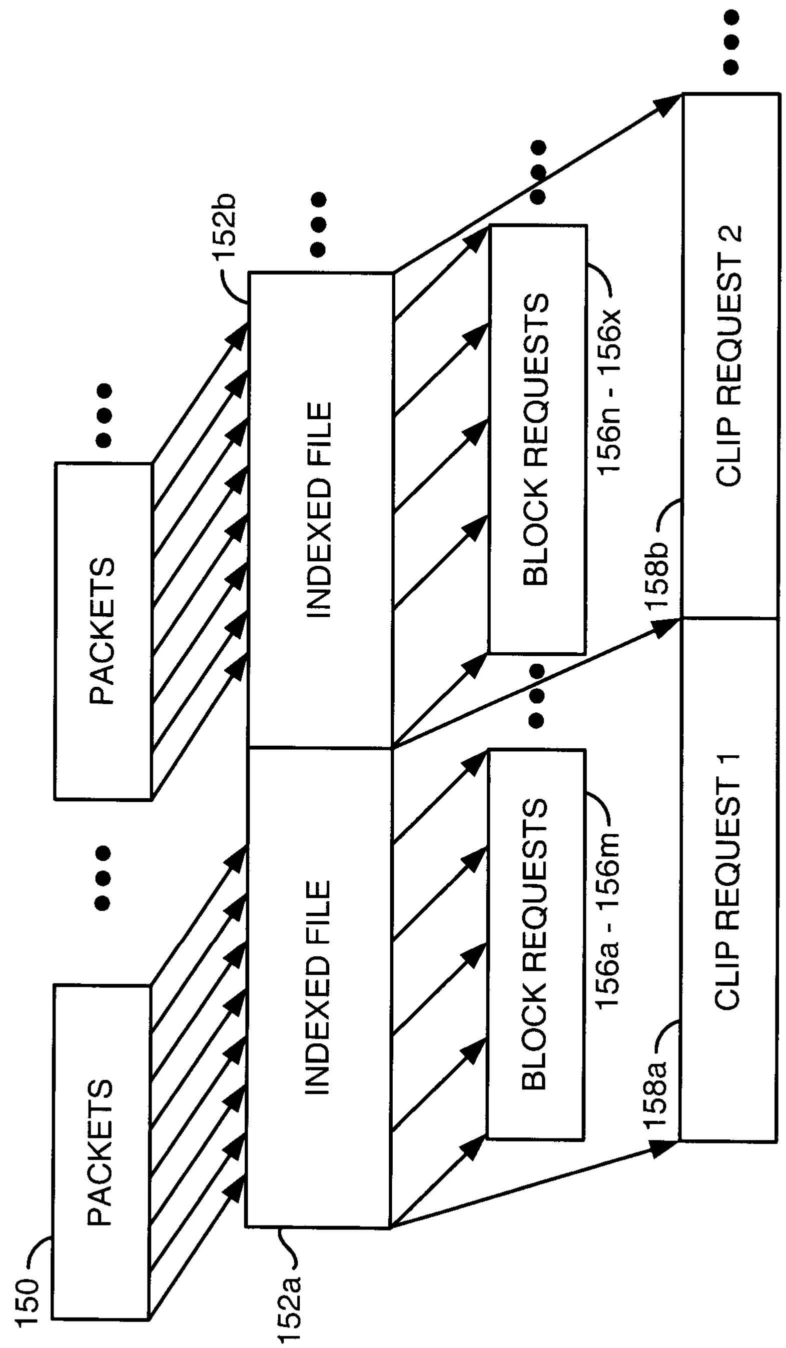
FIG. 5 is a block diagram of an example data organization involved in a short duration server implementation.

Referring to FIG. 5, a block diagram of an example data organization involved in a short duration server implementation is shown. The web server implementation and the read server implementation may be applied where the module 124 is capable of playing the media file starting once enough data is available to do so (e.g., progressive download). However where the module 124 is capable of playing a media file only after the file is fully downloaded, the incoming clip may be broken into multiple independent clips (e.g., MP4 files) 152*a*-152*b* that may be played seamlessly back to back. Each of the clips 152*a*-152*b* may have a similar structure to the indexed format file 152 of FIG. 4. Thus, the module 136 may be referred to as the "short duration server", where short clips are played sequentially by one or more instantiations of the module 124. In some embodiments, the module 124 may provide sequential requests to the module 136, similar to the read server implementation. The module 136 may respond by sending the requested blocks 156*a*-156*m* (or 156*n*-156*x*) from a current clip 152*a* (or 152*b*). In other embodiments, the module 124 may request entire clips 158*a*-158*b* be sent as single units. The module 136 may respond by sending the requested clips 158*a*-158*b* in the appropriate sequence. Note that most to all of the audio/video samples may remain unpadded in the short duration server implementation.

Figure 6:
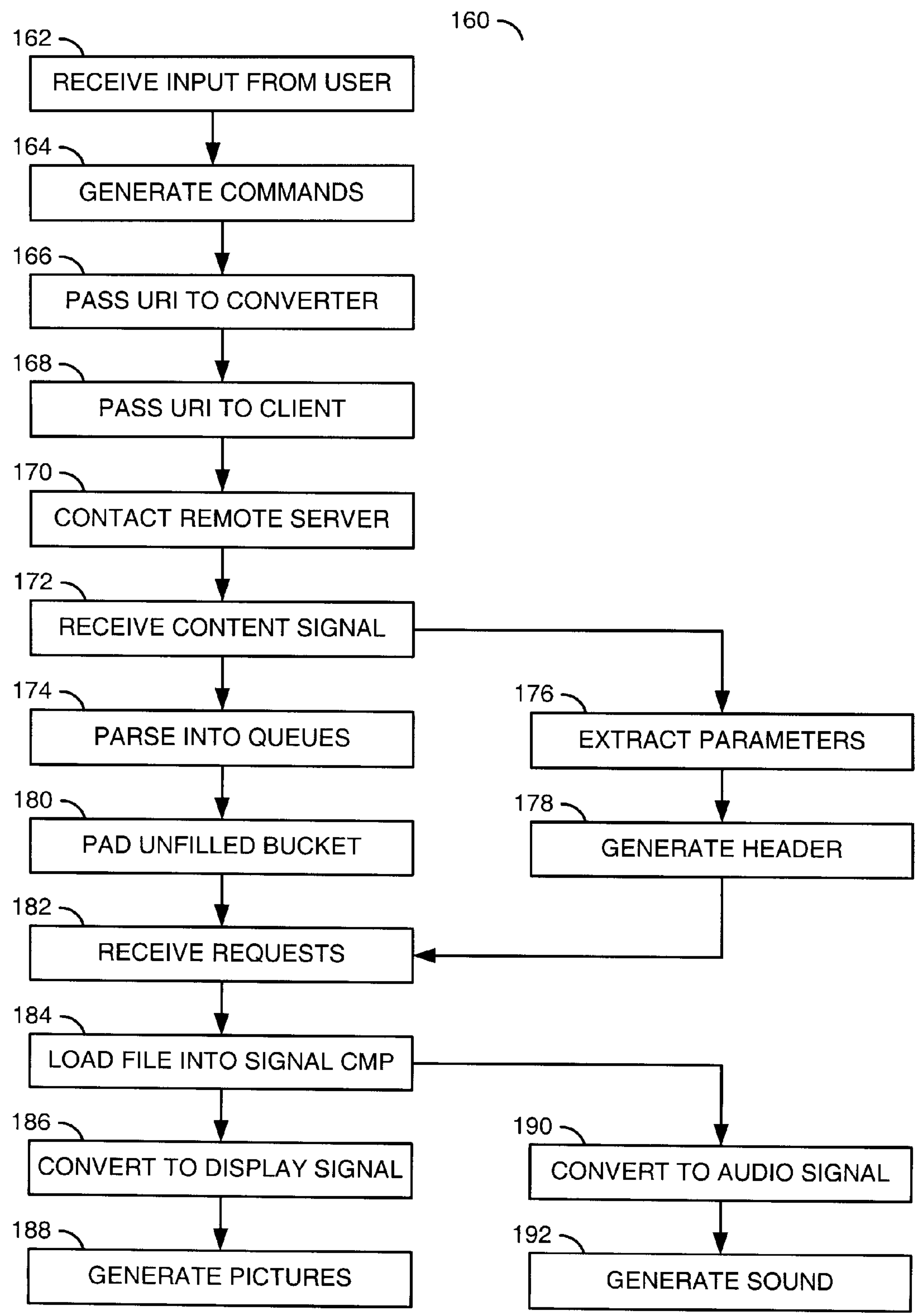
FIG. 6 is a flow diagram of an example method of enabling streaming media delivery to a progressive download native media player.

Referring to FIG. 6, a flow diagram of an example method 160 of enabling streaming media delivery to a progressive download native media player is shown. The method (or process) generally comprises a step (or block) 162, a step (or block) 164, a step (or block) 166, a step (or block) 168, a step (or block) 170, a step (or block) 172, a step (or block) 174, a step (or block) 176, a step (or block) 178, a step (or block) 180, a step (or block) 182, a step (or block) 184, a step (or block) 186, a step (or block) 188, a step (or block) 190 and a step (or block) 192. The method 160 may be implemented in the apparatus 106, the network 104 and the server 102.

In the step 162, the circuit 114 may receive one or more inputs from a user to obtain and play a particular content. The circuit 114 may generate one or more commands in the signal CMD based on the received inputs in the step 164. The signal CMD may inform the module 124 of the identity of the particular content being requested and a location of the content.

The module 124 may use the identity and the location of the requested content to generate a Universal Resource Identifier (URI). The URI may be passed from the module 124 to the module 136 or the module 134 in the step 166. The module 136 or 134 may pass the URI to the module 130 as part of step 168. The module 130 may respond to the request by contacting the server 102 via the network 104 in the step 170.

Upon receipt of the request for the particular content, the server 102 may locate and transfer the content in the signal NNMPC. The module 132 may receive the content in the step 172. As the content is delivered to the apparatus 106, the module 132 may parse the data into the queues 140 and 142 in the step 174. In the step 176, the module 132 may extract the various parameters from the content stream. The parameters are generally made available to the module 134.

Header data corresponding to one or more media files (e.g., MP4 files) may be created from the parameters in the step 178 by the module 134. The number of headers created generally depends on the configuration of the modules 136 and 124 (e.g., web server, read server or short duration server configurations). In the step 180, the module 134 may pad the video buckets and the audio buckets of the media files as appropriate.

To play the media file, the module 124 may issue one or more requests to the module 136 in the step 182. The number and sequencing of the requests generally depends on the configuration of the modules 136 and 124 (e.g., web server, read server or short duration server configurations). The module 136 may respond to the requests from the module 124 by reading the video data and the audio data of the media file via the signal CMP, serving the data as one or more clips in an indexed format (e.g., progressive download) and then sequentially load the data into the signal B in the step 184.

Upon receipt of each clip from the module 136, the module 124 may convert the video content into a display format in the signal VIDEO in the step 186. The circuit 116 may convert the signal VIDEO into a sequence of pictures (e.g., frames or fields) in the signal PICTURES in the step 188. As the module 124 is processing the video content, the audio content may be converted in the step 190 into an audio format in the signal AUDIO. Where the circuit 118 implements a speaker, the signal AUDIO may be converted into the acoustic signal SOUND in the step 192. Where the circuit 118 implements a microphone jack, the signal AUDIO may be amplified and passed to a headphone in the electrical signal SOUND. Presentation of the signal PICTURES and/or the signal SOUND may occur while the video data and the audio data are still being received by the module 120.

An overriding criteria guiding behavior across all platforms may be to maximize user quality of experience subject to two constraints. A first constraint may be to minimize system resource requirements (e.g., CPU, network stack, memory, battery, etc.). A second constraint may be to adhere to the API of a particular platform and the module 124.

The module 136 may have several responsibilities. For example, the module 136 may be responsible for invoking and/or serving multiple instances of the module 124. Invoking multiple instances may be performed where supported by the platform and the API. Moreover, multiple instances may be used where (i) similar resource usage with a single instance is impractical and (ii) seamless sequential playback between multiple instances is possible. In the context of multiple instances of module 124, seamless sequential playback generally means that multiple independent clips may be delivered one after another to alternating instances without creating audio/video artifacts at the clip boundaries. An advantage of using multiple instances may be smaller clips due to the absence of padding. Each clip may be authored for a window of time for which all appropriate data has been received by the module 122 and therefore the indexing is fully determined.

The format of the clips is generally based on the platform and API of the module 124. In general, self-contained clips may be generated and delivered in a sequential seamless manner, as described above. The sample data from the source may be buffered by the module 134 for a fixed interval (e.g., one or more seconds). Therefore, the associated metadata may be fully determined and may be authored without use of padding for the interval. Once the resulting self-contained clip is delivered to the module 136, the module 134 may begin to author the self-contained clip for one or more following intervals. Generation of the clips may be performed in a pipelined fashion.

The module 136 may also be responsible for communicating with the module 124 via a published API and ultimately delivering content from the module 134 to the module 124. Communications between the module 136 and the module 124 may have several forms. In some embodiments, the module 124 may use a URI. In such a case, the module 136 generally includes a simple web server that "hosts" the player-compliant clips, buffers locally and responds to one or more HTTP requests from the module 124. In other embodiments, the module 124 may issue one or more startup commands followed by one or more play commands, with associated clips/buffers for each command. Each additional play command is generally associated with an additional clip or buffer, which is a continuation of the previous clip or buffer.

The module 124 may have several (e.g., four) modes of behavior. The modes of behavior generally represent how responsibilities are realized by the module 124. The modes may arise from the criteria to maximize Quality of Experience (QoE) subject to the two constraints, minimizing system resource consumption and adherence to the API of the module 124. Not all modes may be realizable on all platforms (e.g., apparatus 106). For a given platform, a preferred mode that is realizable may be selected as the only or a dominant mode of operation. However, other realizable modes may also be employed.

A first mode of behavior generally involves seamless sequential playback without padding via a single instance of the module 124. The platform and API should support multiple inputs, either in parallel (e.g., via concurrent HTTP requests) or serially (e.g., via multiple clips or buffers). The module 134 may generate multiple, non-padded, self-contained clips from the input received in the signal A, as described above. To force the module 124 to generate concurrent HTTP requests, clip metadata and sample data should be separated within the media file. When the module 124 receives the initial metadata from an initial HTTP request, the module 124 may see that the sample data is further within the media file and issue another HTTP request for data starting prior to the desired samples. Therefore, metadata may be authored progressively and padding may be avoided. As a result, a response to the initial HTTP request is throttled, serving metadata only as generated from the module 134. Where multiple clips or buffers are provided by the module 136, the API of the module 124 may notify the application when ready for a new clip or buffer. The application may then invoke the appropriate API with the new clip or buffer.

A second mode of behavior may be used where (i) achieving a seamless sequential playback, without using padding and using a single instance of the module 124 is difficult and (ii) the platform and API support multiple instances of the module 124. In the second mode, the platform and API may support seamless sequential playback (e.g., no audio/video artifacts may be created at the clip boundaries). Operation of the module 134 may be similar to that described above for generating sequential, non-overlapping clips. The module 136 may deliver the generated clips in ping-pong fashion to alternate instances of the module 124, thereby hiding any per-clip startup processing or latencies.

A third mode of behavior may maintain seamless playback using padding. The third mode may be applied to situations involving a single instance of the module 124. For example, the platform may have no support for multiple player instances or may not maintain seamless sequential playback between multiple player instances. Moreover, the platform may not support multiple inputs to a single instance of the module 124.

A fourth mode of behavior may result in non-seamless sequential playback. The module 124 may support either single or multiple instances in the fourth mode. The module 134 may generate multiple clips and switch between clips at inter-clip boundaries. Switching between the clips may be visible to the user as the transitions may be non-seamless.

In a first example implementation of the system 100, the server 102 may be a remote streaming server that supports RTSP/RTP. The server 102 may communicate with mobile devices, such as an iPhone (iPhone™ is a trademark of Apple Inc., Cupertino, Calif.), over a reliable transport protocol such as TCP or Reliable UDP. The module 130 may be a simple RTP/RTSP client on the circuit 110. The module 130 generally issues and responds to RTSP messages. Once a session is established, the remote server 102 may stream RTP to the apparatus 106. The incoming packets may be retrieved as a continuous stream by the module 132 through APIs (e.g., sockets) of the module 120. The module 132 generally delivers the depacketized stream to the module 134. The module 134 may convert from the RTP format to the MP4 format.

The module 136 generally comprises a local server that hosts the MP4 clips and responds to HTTP requests from the module 124. Although the metadata in the signal CMP may be authored a priori and the response to the HTTP requests are not throttled (e.g., metadata is delivered to module 124 as fast as the module 124 will read), the sample data should be delivered in a throttled manner as the samples may only be embedded in the MP4 file sample data positions once received from the RTP stream.

In a second example implementation of the system 100, the server 102 may be a remote streaming server that supports RTSP/RTP and communicates with a device over a reliable transport protocol, such as TCP or Reliable UDP. The module 130 may be a simple RTP/RTSP client on the circuit 110. The module 130 generally issues and responds to RTSP messages. Once a session is established, the server 102 may stream RTP to the apparatus 106. Packets conveyed by the stream may be retrieved as a continuous stream by the module 132 through network APIs (e.g., sockets). The module 132 generally delivers the depacketized stream to the module 134 for further processing. The module 134 may convert the content from the RTP format to the MP4 format. In the example, the apparatus 106 and API of the module 124 generally supports seamless sequential playback to multiple instances. Communication between the module 124 and the module 136 may be via a series of commands.

The functions performed by the diagrams of FIGS. 1 to 6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, netbook computers, tablet computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. A method for enabling streaming to a media player without native streaming support, comprising the steps of:

parsing video data representative of a scene from a content signal into a video queue;

(A) authoring at least one media file based on said content signal, (i) said media file having an indexed format compatible with said media player and (ii) said content signal (a) is received from a remote server through a network, (b) uses a first transfer protocol and a first format at least one of which is incompatible with said media player and (c) conveys said video data, wherein authoring comprises the sub-steps of:

predetermining a number of a plurality of video buckets in said media file before the content signal is received in its entirety;

generating an index for inclusion in said media file, wherein the index defines the number of the plurality of video buckets and a size of each of the plurality of video buckets; and arranging said video data from said video queue into a plurality of video buckets in said media file as the content signal is received from the remote server;

(B) generating a local signal carrying said media file, said local signal having a second transfer protocol compatible with said media player; and (C) transferring said local signal to said media player while said content signal is being received, wherein said media player recreates said video data as a visual depiction on a display based on said local signal.

2. The method according to claim 1, further comprising the step of:

connecting to said remote server to obtain said content signal.

3. The method according to claim 1, wherein the parsing further comprises parsing audio data from the content signal into an audio queue, wherein the authoring further comprises the sub-step of arranging said audio data from said audio queue into a plurality of audio buckets in said media file, wherein a number of the plurality of audio buckets is predetermined for said media file before the content signal is received in its entirety.

4. The method according to claim 3, wherein step (A) further comprises the sub-step of:

adding padding to each of said video buckets not completely filled and each of said audio buckets not completely filled.

5. The method according to claim 3, wherein step (A) comprises the sub-step of:

extracting a plurality of parameters from session data received in said content signal.

6. The method according to claim 5, wherein step (A) further comprises the sub-step of:

generating a header in said media file based on said parameters, said header comprising the index.

7. The method according to claim 3, wherein said at least one media file comprises a plurality of media files and step (A) further comprises the sub-steps of:

arranging said video data from a video queue into a plurality of video buckets dispersed across said media files; and arranging said audio data from an audio queue into a plurality of audio buckets dispersed across said media files.

8. The method according to claim 7, wherein step (B) comprises the sub-step of:

loading said media files one-at-a-time into said local signal.

9. The method according to claim 1, wherein said second protocol comprises a progressive download protocol and step (B) comprises the sub-step of:

loading said media file as a plurality of segments in said local signal in response to a plurality of requests received from said media player, each of said requests specifying a different range of said media file, said ranges being unrelated to each other in at least one of (i) size and (ii) position in said media file.

10. The method according to claim 9, wherein said local signal is generated by a web server.

11. The method according to claim 1, wherein said second protocol comprises a progressive download protocol and step (B) comprises the sub-step of:

loading said media file as a plurality of blocks in said local signal in response to a plurality of requests received from said media player, said blocks being presented sequentially.

12. The method according to claim 11, wherein said local signal is generated by a read server.

13. The method according to claim 1, wherein the steps are performed by processor executable instructions contained within a computer readable medium.

14. An apparatus comprising:

a display; and a circuit configured to:

parse video data representative of a scene from a content signal into a video queue, (i) author at least one media file based on said content signal, (a) said media file having an indexed format compatible with a media player without native streaming support and (b) said content signal (1) is received from a remote server through a network, (2) uses a first transfer protocol and a first format at least one of which is incompatible with said media player and (3) conveys said video data, wherein authoring comprises the sub-steps of:

predetermining a number of a plurality of video buckets in said media file before the content signal is received in its entirety;

generating an index for inclusion in said media file, wherein the index defines the number of the plurality of video buckets and a size of each of the plurality of video buckets; and arranging said video data from said video queue into a plurality of video buckets in said media file as the content signal is received from the remote server, (ii) generate a local signal carrying said media file, said local signal having a second protocol compatible with said media player and (iii) transfer said local signal to said media player while said content signal is being received, wherein said media player recreates said video data as a visual depiction on said display based on said local signal.

15. The apparatus according to claim 14, wherein said circuit comprises (i) a generator authoring said media file and (ii) a local server generating said local signal.

16. The apparatus according to claim 15, wherein said circuit further comprises (i) said media player and (ii) a client communicating with said remote server.

17. The apparatus according to claim 14, wherein said first protocol comprises at least one of (i) a real time streaming protocol (ii) a hypertext transport protocol, (iii) a real-time transport protocol, (iv) an MPEG-2 transport stream protocol, (v) a flash video protocol and (vi) a fragmented MPEG-4 part 14 protocol.

18. The apparatus according to claim 14, wherein (i) said indexed format comprises at least one of (a) an MPEG-4 part 14 MP4 format, (b) a third generation partnership 3GP format and (c) a QuickTime MOV format and (ii) said apparatus has a handheld size.

19. The apparatus according to claim 14, wherein the parsing further comprises parsing audio data from the content signal into an audio queue, wherein the authoring further comprises the sub-step of arranging said audio data from said audio queue into a plurality of audio buckets in said media file, wherein a number of the plurality of audio buckets is predetermined for said media file before the content signal is received in its entirety.

20. An apparatus comprising:

means for displaying; and means for processing configured to:

parse video data representative of a scene from a content signal into a video queue, (i) author at least one media file based on said content signal (a) said media file having an indexed format compatible with a media player without native streaming support and (b) said content signal (1) is received from a remote server through a network, (2) uses a first transfer protocol and a first format at least one of which is incompatible with said media player and (3) conveys said video data, wherein authoring comprises the sub-steps of:

predetermining a number of a plurality of video buckets in said media file before the content signal is received in its entirety;

generating an index for inclusion in said media file, wherein the index defines the number of the plurality of video buckets and a size of each of the plurality of video buckets; and arranging said video data from said video queue into a plurality of video buckets in said media file as the content signal is received from the remote server, (ii) generate a local signal carrying said media file, said local signal having a second protocol compatible with said media player and (iii) transfer said local signal to said media player while said content signal is being received, wherein said media player recreates said video data as a visual depiction on said means for displaying based on said local signal.

* * * * *